(12) United States Patent
Kim (10) Patent No.: US 7,865,666 B2
(45) Date of Patent: Jan. 4, 2011

(54) CACHE MEMORY SYSTEMS AND METHODS THEREOF

(75) Inventor: Dong-keun Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 377 days.

(21) Appl. No.: 11/509,753

(22) Filed: Aug. 25, 2006

(65) Prior Publication Data
US 2007/0050552 A1   Mar. 1, 2007

(30) Foreign Application Priority Data
Aug. 26, 2005   (KR) .................. 10-2005-0078908

(51) Int. Cl.
*G06F 12/00* (2006.01)
(52) U.S. Cl. ................ 711/118; 711/119; 711/122; 711/137
(58) Field of Classification Search ........... 711/118, 711/119, 122, 137
See application file for complete search history.

(56) References Cited

U.S. PATENT DOCUMENTS

| | | | | |
|---|---|---|---|---|
| 7,278,697 | B2 * | 10/2007 | Plunkett .................. | 347/5 |
| 7,302,592 | B2 * | 11/2007 | Shipton et al. ........... | 713/300 |
| 7,377,608 | B2 * | 5/2008 | Walmsley et al. ........ | 347/13 |
| 2003/0196045 | A1 | 10/2003 | Matsubara et al. | |
| 2004/0003179 | A1 * | 1/2004 | Shirahige et al. ........ | 711/137 |
| 2004/0174570 | A1 * | 9/2004 | Plunkett et al. ......... | 358/3.13 |

FOREIGN PATENT DOCUMENTS

| | | |
|---|---|---|
| JP | 10-116229 | 5/1998 |
| JP | 2002-297379 | 10/2002 |
| JP | 2005-100034 | 4/2005 |
| KR | 1020020037855 | 5/2002 |

OTHER PUBLICATIONS

Taiwanese Office Action dated Feb. 19, 2009 with English translation.

* cited by examiner

*Primary Examiner*—Kevin L Ellis
*Assistant Examiner*—Mehdi Namazi
(74) *Attorney, Agent, or Firm*—Harness, Dickey & Pierce, P.L.C.

(57) ABSTRACT

Cache memory systems and methods thereof are provided. A first example cache memory system may include a central processing unit (CPU) and a first memory, a second memory positioned between the CPU and the first memory and storing at least one block of the first memory and a block quantity determination unit which determines a block quantity indicating a number of blocks of the first memory to be stored in the second memory. A second example cache memory system, including a cache memory receiving a request to provide data associated with an input address, determining whether the input address is included in the cache memory, loading a plurality of adjacent data blocks, associated with the input address, from the main memory if the input address is not included within the cache memory.

22 Claims, 5 Drawing Sheets

CACHE MEMORY SYSTEMS AND METHODS THEREOF

PRIORITY STATEMENT

This application claims the benefit of Korean Patent Application No. 10-2005-0078908, filed on 26 Aug. 2005, in the Korean Intellectual Property Office, the disclosure of which is incorporated herein in its entirety by reference.

BACKGROUND OF THE INVENTION

1. Field of the Invention

Example embodiments of the present invention relate generally to cache memory systems and methods thereof, and more particularly to cache memory systems and methods of retrieving data within the cache memory systems.

2. Description of the Related Art

Generally, an operating speeds of memory (e.g., hard drives, read access memory (RAM), etc.) increase at a slower pace than operating speeds of processors, such as central processing units (CPUs). Thus, there may typically be a difference between the operating speeds of a CPU and a memory used in a memory system. Conventional memory systems may include a cache memory architecture to at least partially account for the above-noted timing discrepancy between memory and processors.

In the conventional cache memory architecture, a CPU may access only a portion of a main memory within a given period of time, and this phenomenon may be referred to as "spatial locality". A cache memory, having a higher operating speed than the main memory, may be positioned between a CPU and a main memory. The cache memory may store a portion of the main memory (e.g., a most frequently or recently accessed portion). Accordingly, at least some of the time, the cache memory may reduce memory access times. A cache memory may include a plurality of blocks and may perform read and write operations in units of the blocks.

Figure 1:
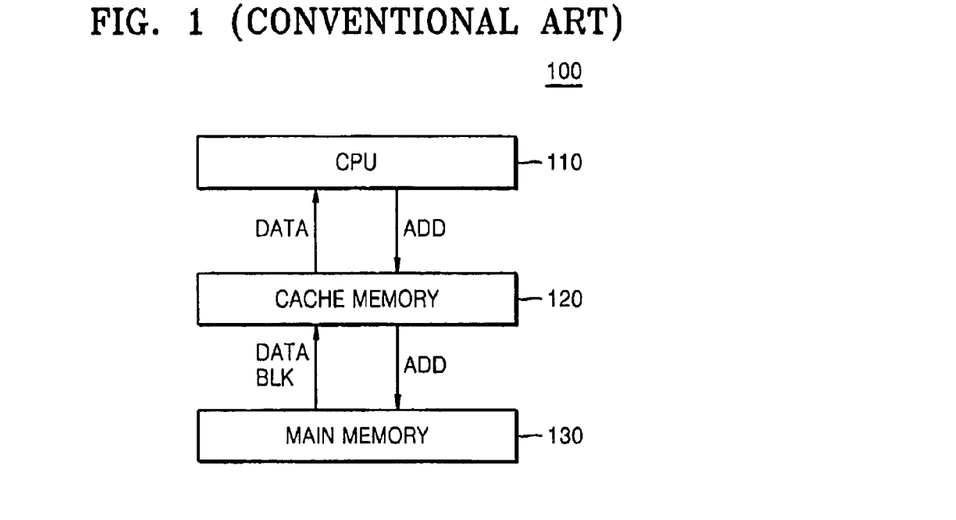
FIG. 1 illustrates a block diagram of a conventional cache memory system.

FIG. 1 is a block diagram of a conventional cache memory system 100. Referring to FIG. 1, the conventional cache memory system 100 may include a CPU 110, a cache memory 120 and a main memory 130.

Referring to FIG. 1, if the CPU 110 issues a request for an address ADD in the main memory 130, the cache memory system 100 may determine whether the address ADD is included within the cache memory 120. If the address ADD is determined to be included within the cache memory 120 (e.g., referred to as a "cache hit"), data DATA stored at the address ADD in the cache memory 120 may be transferred to the CPU 110.

However, if the address ADD is determined not to be included within the cache memory 120 (e.g., referred to as a "cache miss"), a block containing the address ADD may be extracted from the main memory 130 and copied to the cache memory 120, and the data DATA stored at the address ADD in the main memory 130 may be transferred to the CPU 110. As used herein, blocks may be units in which data may be written to or read from the cache memory 120 (e.g., 32 bytes, 64 bytes, etc.).

Generally, the larger the block sizes within the cache memory 120, the easier it may be to enhance the spatial locality of the cache memory 120 (e.g., the portion of memory which may be accessed in a given period of time). However, because the storage capacity of the cache memory 120 is relatively limited (e.g., typically much less than the main memory 130), larger block sizes in the cache memory 120 means that a smaller number of blocks are stored within the cache memory 120. Accordingly, if data stored in the cache memory 120 fluctuates frequently, a performance of the cache memory 120 may deteriorate (e.g., a higher probability of misses and a lower probability of hits). Therefore, a block size of a cache memory may typically be fixed (e.g., only one block size per cache), and the block size may be selected to achieve a balance between spatial locality and cache hit/miss performance.

In addition, in the conventional cache memory system 100 of FIG. 1, only one block of data from the main memory 130 may be copied/transferred to the cache memory 120 during any given time. Thus, if the CPU 110 has a spatial locality exceeding a single block size, a probability of obtaining a cache hit of the cache memory 120 may decrease.

SUMMARY OF THE INVENTION

An example embodiment of the present invention is directed to a cache memory system, including a central processing unit (CPU) and a first memory, a second memory positioned between the CPU and the first memory and storing at least one block of the first memory and a block quantity determination unit which determines a block quantity indicating a number of blocks of the first memory to be stored in the second memory.

Another example embodiment of the present invention is directed to a method of retrieving data in a system including a CPU, a first memory and a second memory, including determining whether an input address included in the second memory, determining a block quantity indicating a number of blocks, from the first memory, to be copied to the second memory, if the input address is not included within the second memory and copying a number of blocks equal to the block quantity from the first memory to the second memory and transferring data corresponding to the input address in the first memory to the CPU.

Another example embodiment of the present invention is directed to a cache memory system, including a cache memory receiving a request to provide data associated with an input address, determining whether the input address is included in the cache memory, loading a plurality of adjacent data blocks, associated with the input address, from the main memory if the input address is not included within the cache memory.

Another example embodiment of the present invention is directed to a method of retrieving data, including receiving a request to provide data associated with an input address, determining whether the input address is included in a cache memory, loading the requested data associated with the input address from a main memory if the determining indicates the input address is not included in the cache memory, the loaded data including a plurality of adjacent data blocks.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
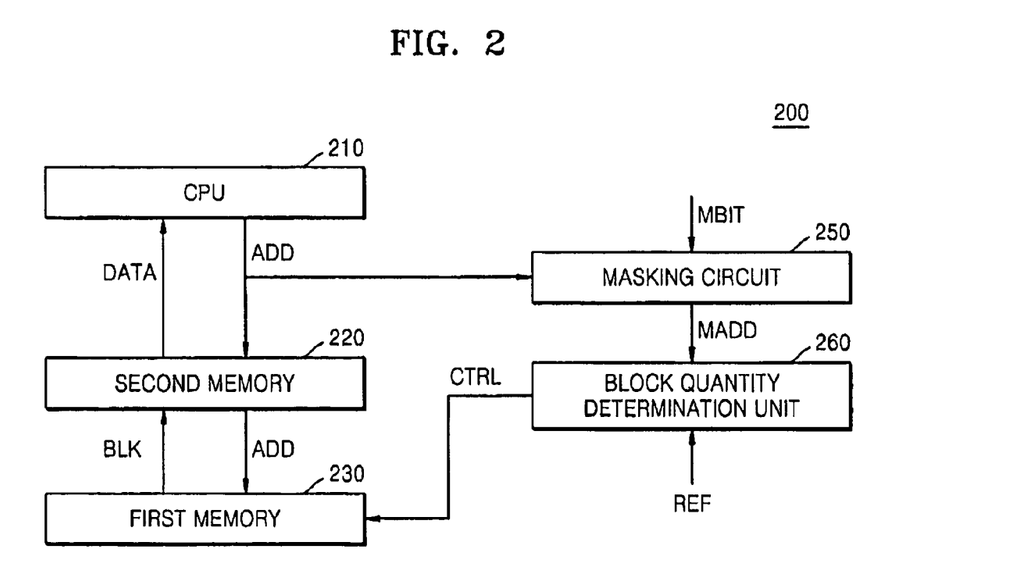
FIG. 2 illustrates a block diagram of a cache memory system according to an example embodiment of the present invention.

FIG. 2 illustrates a block diagram of a cache memory system 200 according to an example embodiment of the present invention.

In the example embodiment of FIG. 2, the cache memory system 200 may include a CPU 210, a first memory 230, a second memory 220 and a block quantity determination unit 260. The operating speed of the first memory 230 may be lower than the operating speed of the CPU 210. The second memory 220, which may store a portion of the data stored in the first memory 230, may be positioned between the CPU 210 and the first memory 230 (e.g., in order to handle the difference between the operating speed of the first memory 230 and the operating speed of the CPU 210).

In the example embodiment of FIG. 2, the first memory 230 may be a main memory, and the second memory 220 may be a cache memory. Thus, for convenience of explanation, it may hereinafter be assumed that the first memory 230 is a main memory and the second memory 220 is a cache memory. Generally, as discussed in the Background of the Invention section, the cache memory (e.g., second memory 220) may operate at a higher operating speed and with a lower storage capacity as compared to the main memory (e.g., first memory 230).

In the example embodiment of FIG. 2, the block quantity determination unit 260 may output a control signal CTRL in order to determine a number of blocks BLK that may be transferred and stored from the main memory 230 to the cache memory 220. Here, the blocks BLK may refer to sections of a storage area within the main memory 230.

In the example embodiment of FIG. 2, the cache memory system 200 may further include a masking circuit 250. The masking circuit 250 may receive an address ADD from the CPU 210 and may convert the address ADD into a masking address MADD using a masking bit MBIT. The block quantity determination unit 260 may determine the number of blocks that can be transferred and stored from the main memory 230 to the cache memory 220 using the masking address MADD. In more detail, the masking address MADD may include a portion of the address ADD excluding the bits corresponding to the masking bit MBIT. For example, assuming that the address ADD includes 32 bits and the masking bit MBIT is corresponding to lower 8 bits of the address ADD, the masking address MADD may be upper 24 bits of the address ADD. Also, the masking address MADD may be comprised of upper 24 bits of the address ADD and 8 bits of the masking bit MBIT.

Figure 3:
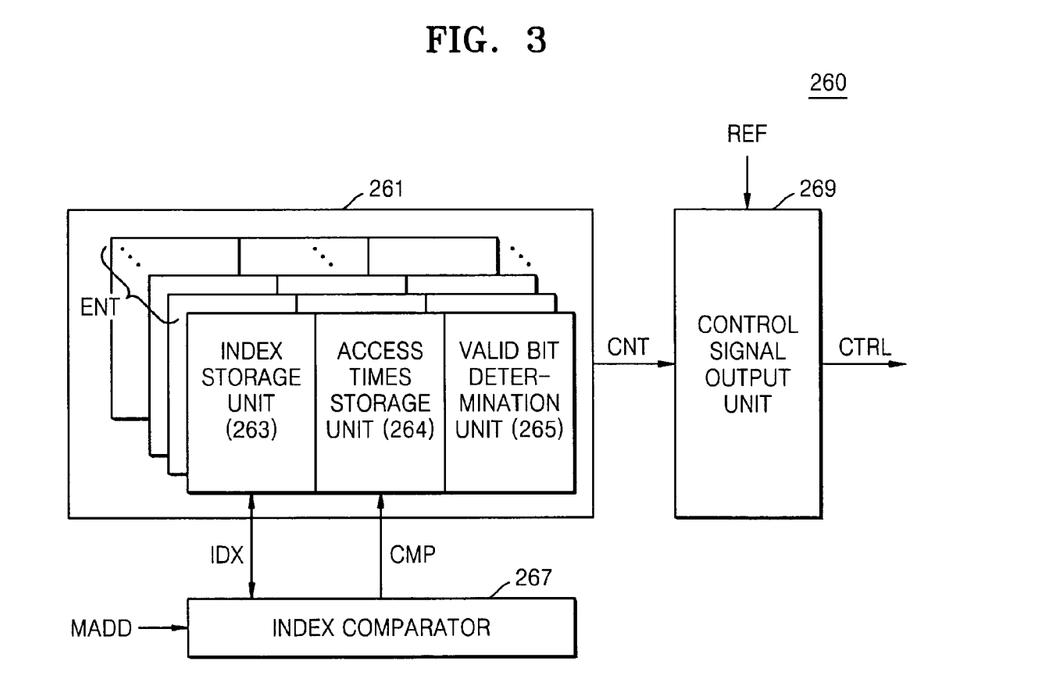
FIG. 3 illustrates a block diagram of the block quantity determination unit 260 of FIG. 2 according to an example embodiment of the present invention.

FIG. 3 illustrates a block diagram of the block quantity determination unit 260 of FIG. 2 according to an example embodiment of the present invention.

In the example embodiment of FIG. 3, the block quantity determination unit 260 may include an index table 261, an index comparison unit 267 and a control signal output unit 269. The index table 261 may store indexes IDX extracted from the masking address MADD and may output information indicating a number of times CNT each of the indexes IDX has been accessed.

In the example embodiment of FIG. 3, each of the indexes IDX may be an entire masking address MADD or, alternatively, only a portion of the masking address MADD (e.g., excluding the masking bit MBIT from the masking address MADD). The index comparison unit 267 may receive the masking address MADD from the masking circuit 250, may compare the masking address MADD with each of the indexes IDX, and may output a comparison signal CMP.

In the example embodiment of FIG. 3, the index table 261 may include a plurality of entries ENT, each including an index storage unit 263 and an access times storage unit 264. The index storage unit 263 may store an index IDX, and the access times storage unit 264 may increment a number of times the index IDX stored in the index storage unit 263 has been accessed in response to the comparison signal CMP output by the index comparison unit 265.

In the example embodiment of FIG. 3, each of the entries ENT may also include a valid bit examiner 265. The valid bit examiner 265 may be a bit indicating whether a corresponding entry ENT included in the index table 261 is valid. In an example, the valid bit examiner 265 may be initially set to a first logic level (e.g., a higher logic level or logic "1") to indicate that the corresponding entry ENT is valid. In another example, the valid bit examiner 265 may be set to a second logic level (e.g., a lower logic level or logic "0"), to indicate that the corresponding entry ENT is valid if an index IDX is stored in the corresponding entry ENT.

In the example embodiment of FIG. 3, the block quantity determination unit 260 may further include a control signal output unit 269. The control signal output unit 269 may compare the number of access times CNT a given index IDX has been accessed with a reference number REF and may output a control signal CTRL to determine the number of blocks that can be transferred and stored from the main memory 230 to the cache memory 220.

Example operation of the cache memory system 200 will now be described in further detail with reference to FIGS. 2 and 3.

In example operation of the cache memory system 200, with reference to FIGS. 2 and 3, the CPU 210 may issue a request for data DATA stored at an address ADD in the main memory 230. The cache memory system 200 may determine whether the address ADD exists in the cache memory 220. If the address ADD is included in the cache memory 220 (e.g., a cache hit), the data DATA stored in association with the address ADD in the cache memory 220 may be transferred to the CPU 210.

In example operation of the cache memory system 200, with reference to FIGS. 2 and 3, if the address ADD is not included in the cache memory 220 (e.g., a cache miss), a block including the address ADD may be read from the main memory 230 and stored in the cache memory 220, and the data DATA stored at the address ADD in the main memory 230 may be transferred to the CPU 210.

Referring again to FIG. 1, the conventional cache memory system 100 may determine data with a spatial locality exceeding one block size as being a cache miss, and thus may access the main memory 130 to fetch the data, thereby deteriorating the performance of the cache memory system 100 (e.g., because the main memory 130 may typically be slower than the cache).

In example operation of the cache memory system 200, with reference to FIGS. 2 and 3, the cache memory system 200 may transmit the address ADD to the cache memory 220 (e.g., similar to the conventional cache memory system 100) and also to the masking circuit 250.

In example operation of the cache memory system 200, with reference to FIGS. 2 and 3, the masking circuit 250 may convert the address ADD into a masking address MADD using a masking bit MBIT. The masking bit MBIT may be used for determining the number of blocks that can be stored in the cache memory 220, and the masking bit MBIT may be altered by a user. For example, if the address ADD includes 32 bits and the masking bit MBIT includes 8 bits, the "lower" (e.g., least significant) 8 bits of the address ADD may correspond to the masking bit MBIT, and the remaining "upper" 24 bits of the address ADD may be the masking address MADD. If the masking bit MBIT includes 8 bits, the block storage capacity for all blocks stored in the cache memory 220 may be 256 bytes (i.e., 28 bytes). Thus, assuming that the size of a single block is 64 bytes, the number of blocks stored in the cache memory 220 may equal 4.

In example operation of the cache memory system 200, with reference to FIGS. 2 and 3, the index comparator 267 of the block quantity determination unit 260 may compare the masking address MADD with each of a plurality of indexes IDX stored in an index storage unit 263 of each of a plurality of entries ENT. Here, the indexes IDX may correspond to given portions of the main memory 230.

In example operation of the cache memory system 200, with reference to FIGS. 2 and 3, if the masking address MADD matches one or more of the indexes IDX stored in the index storage unit 263, an access times storage unit 264 corresponding to the index storage unit 263 may increment a value representing a number of access times CNT the index IDX that matches the masking address MADD has been accessed. In an alternative example, if none of the indexes IDX stored in the index storage unit 263 match the masking address MADD, the masking address MADD may be stored in an entry ENT whose valid bit examiner 265 may be set to, for example, the second logic level (e.g., a lower logic level or logic "0"), indicating that the entry ENT is invalid, thereby registering the entry ENT.

In example operation of the cache memory system 200, with reference to FIGS. 2 and 3, the control signal output unit 269 may compare the number of access times CNT the index IDX that matches the masking address MADD has been accessed with a reference number REF in order to determine whether a spatial locality may be expanded to a region corresponding to the masking bit MBIT (e.g., expanded to a region as large as 4 blocks). Thereafter, the control signal output unit 269 may output a control signal CTRL.

In example operation of the cache memory system 200, with reference to FIGS. 2 and 3, the cache memory system 200 may transfer a number of blocks BLK designated by the control signal CTRL from the main memory 230 to the cache memory 220 and may transfer the data DATA stored at the address ADD in the main memory 230 to the CPU 210.

In example operation of the cache memory system 200, with reference to FIGS. 2 and 3, if the number of access times CNT the index that matches the masking address MADD has been accessed is less than the reference number REF, the cache memory system 200, like the conventional cache memory system 100, transfers only a single block from the main memory 230 to the cache memory 220. However, if the number of times CNT the index that matches the masking address MADD has been accessed is greater than or equal to the reference number REF, the cache memory system 200 may determine that local spatiality may be expanded and may transfer a plurality of blocks corresponding to the masking bit MBIT (e.g., 4 blocks) from the main memory 230 to the cache memory 220.

Therefore, the cache memory system 200 may store a plurality of blocks corresponding to the number of masking bit MBIT in the cache memory 220, thereby achieving an affect similar to simply expanding the block sizes (e.g., because more than one associated or adjacent block may be loaded). Therefore, the cache memory system 200 may reduce a probability of a cache miss, and may likewise reduce the amount of time required to retrieve data from memory.

Figure 4:
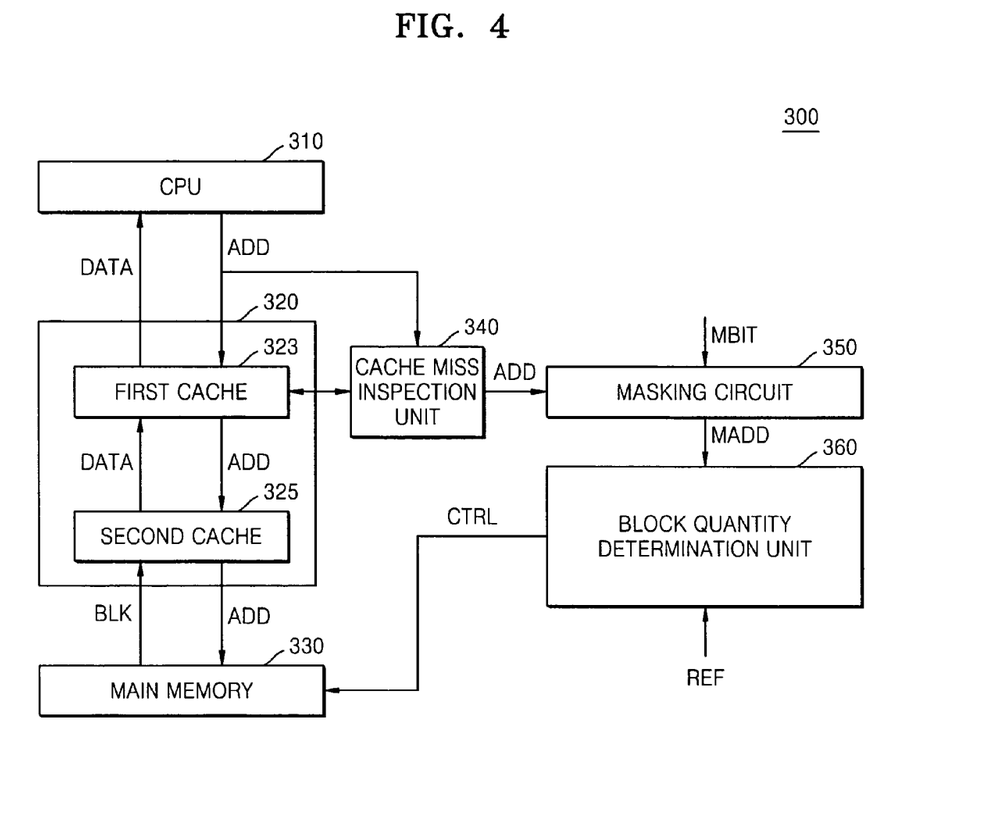
FIG. 4 illustrates a block diagram of a cache memory system according to another example embodiment of the present invention.

FIG. 4 illustrates a block diagram of a cache memory system 300 according to another example embodiment of the present invention.

In the example embodiment of FIG. 4, the cache memory system 300 may include a CPU 310, a cache memory 320, a main memory 330, a masking circuit 350, and a block quantity determination unit 360.

In the example embodiment of FIG. 4, the cache memory 320 may include a first cache 323 and a second cache 325. The first cache 323 may be referred to as an L1 cache, and the second cache 325 may be referred to as an L2 cache. In an example, the first cache 323 may have a smaller storage capacity than the second cache 325 and the first cache 323 may be faster (e.g., have a lower access latency, etc.) than the second cache 325.

In the example embodiment of FIG. 4, the cache memory system 300 may store a plurality of blocks in response to a control signal CTRL, which may increase a likelihood of "cache pollution" occurring in the first cache 323. Therefore, the cache memory system 300 may also include a cache miss inspection unit 340 for storing a number of blocks, determined by the block quantity determination unit 360, in the second cache 325.

Example operation of the cache memory system 300 will now be described in detail with reference to FIG. 4. Further, the example operation described below focuses on differences between the example operation of the cache memory system 300 and the example operation of the cache memory system 200 (described above) to avoid redundancy.

In example operation of the cache memory system 300 of FIG. 4, the CPU 310 may request data at a address ADD. The cache memory system 300 may transfer the address ADD to the first cache 323 of the cache memory 320 and to the cache miss inspection unit 340.

In example operation of the cache memory system 300 of FIG. 4, if the address ADD is included within the cache memory 320 (e.g., a cache hit occurs), the cache memory system 300 (e.g., similar to the conventional cache memory system 100) may transfer data DATA at the address ADD in the cache memory 320 to the CPU 310. However, if the address ADD is not included within the cache memory 320 (e.g., a cache miss occurs), the cache miss inspection unit 340 may transfer the address ADD to the masking circuit 350.

In example operation of the cache memory system 300 of FIG. 4, the masking circuit 350 may convert the address ADD into a masking address MADD using a masking bit MBIT. The block quantity determination unit 360 may transfer a control signal CTRL to the main memory 330 in response to the masking address MADD.

In example operation of the cache memory system 300 of FIG. 4. the cache memory system 300 may store a plurality of blocks of the main memory 330, the plurality of blocks including a number of blocks corresponding to a block quantity determined by the block quantity determination unit 360, in the second cache 325 in response to the control signal CTRL. The cache memory system 300 may transfer the data DATA corresponding to the address ADD in the second cache 325 to the CPU 310. In an example, the data DATA transferred from the second cache 325 to the first cache 323 may be different from the data DATA transmitted from the first cache 323 to the CPU 310.

Figure 5:
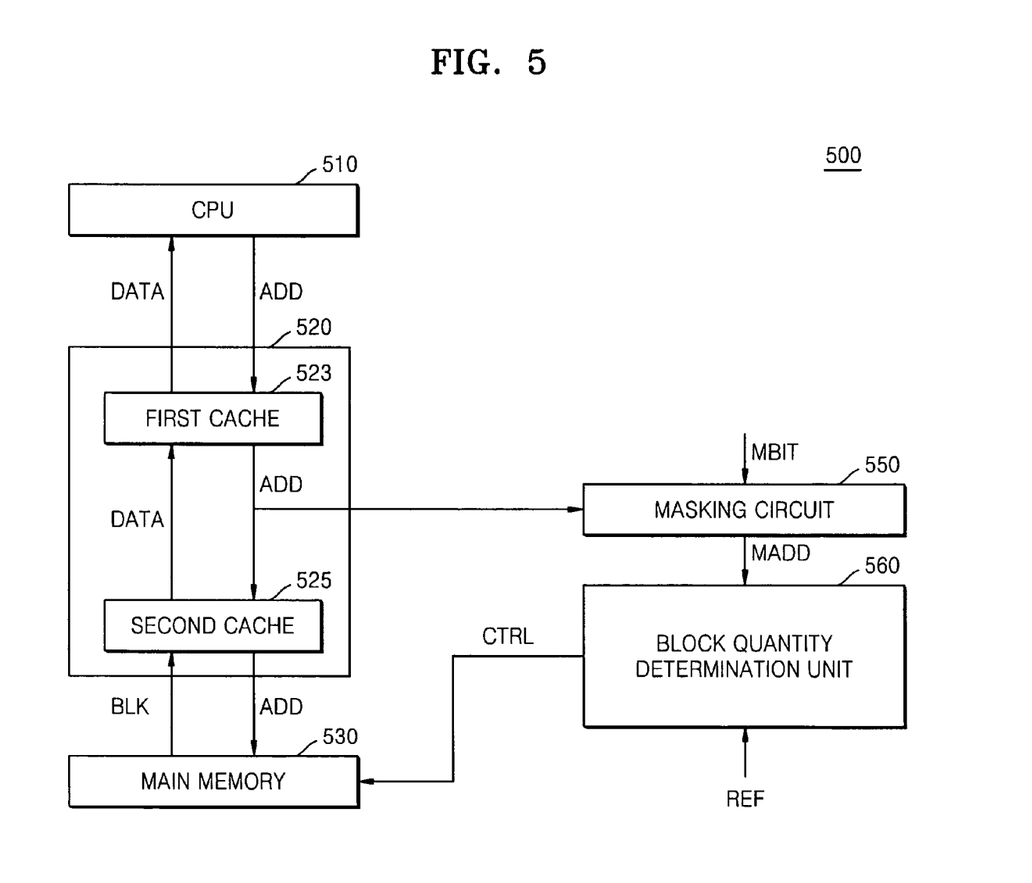
FIG. 5 illustrates a block diagram of a cache memory system according to another example embodiment of the present invention.

FIG. 5 illustrates a block diagram of a cache memory system 500 according to another example embodiment of the present invention. In the example embodiment of FIG. 5, the cache memory system 500 may include a CPU 510, a cache memory 520, a main memory 530, a masking circuit 550 and a block quantity determination unit 560.

In the example embodiment of FIG. 5, the cache memory system 500, unlike the cache memory system 300 of FIG. 4, may not include a cache miss inspection unit. Rather, the masking circuit 550 of the cache memory system 500 may use an address ADD received from a first cache 523 of the cache memory 520 instead of an address ADD received from the CPU 510. Accordingly, the cache memory system 500 may store a number of blocks of the main memory 530 corresponding to a block quantity determined by the block quantity determination unit 560 in a second cache 525 of the cache memory 520, which may have a higher storage capacity than the first cache 523.

Example operation of the cache memory system 500 will now be described in further detail with respect to FIG. 5.

In example operation of the cache memory system 500 of FIG. 5, the CPU 510 may request data at an address ADD. The cache memory system 500 may transfer the address ADD to the first cache 523 of the cache memory 520.

In example operation of the cache memory system 500 of FIG. 5, if the address ADD is included within the first cache 523 (e.g., a cache hit occurs), the cache memory system 500 (e.g., similar to the conventional cache memory system 100) may transfer data DATA corresponding to the address ADD in the first cache 523 to the CPU 510. However, if the address ADD is not included within the first cache 523 (e.g., a cache miss occurs), the cache memory system 500 may transfer the address ADD to the masking circuit 550. The masking circuit 550 may convert the address ADD into a masking address MADD using a masking bit MBIT.

In example operation of the cache memory system 500 of FIG. 5, the block quantity determination unit 560 may transfer a control signal CTRL to the main memory 530 in response to the masking address MADD.

In example operation of the cache memory system 500 of FIG. 5, the cache memory system 500 may store a number of blocks of the main memory 530 corresponding to a block quantity determined by the block quantity determination unit 560 in the second cache 525 in response to the control signal CTRL. The cache memory system 500 may transfer the data DATA corresponding to the address ADD in the second cache 525 to the CPU 510. In an example, the data DATA transferred from the second cache 525 to the first cache 523 may be different from the data DATA transferred from the first cache 523 to the CPU 510.

Figure 6:
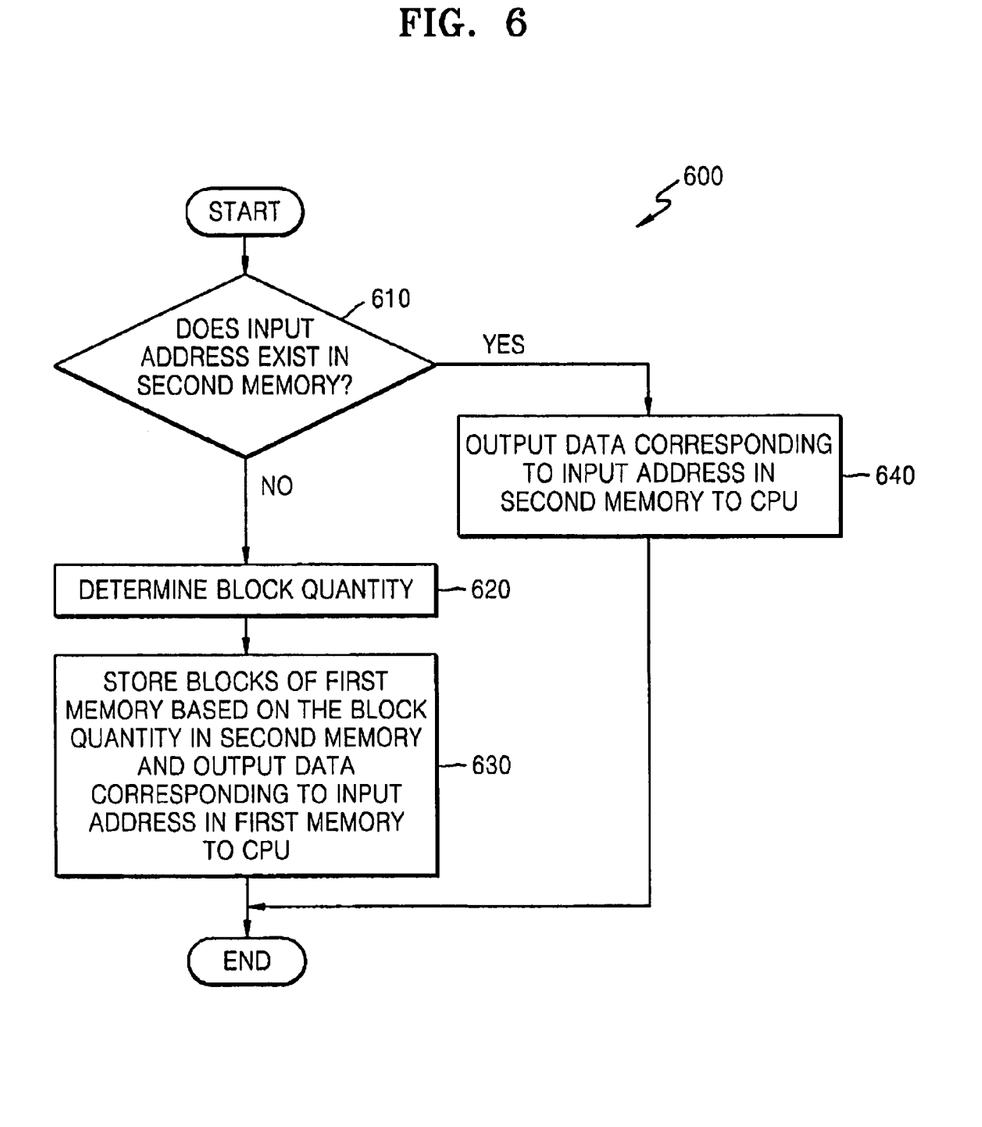
FIG. 6 is a flowchart illustrating a memory process of a cache memory system according to another example embodiment of the present invention.

FIG. 6 is a flowchart illustrating a memory process 600 of a cache memory system according to another example embodiment of the present invention. Referring to FIG. 6, the memory process 600 may be performed by a cache memory system including a CPU, a first memory, and a second memory (e.g., cache memory system 200 of FIG. 2, cache memory system 300 of FIG. 4, cache memory system 500 of FIG. 5, etc.).

In the example embodiment of FIG. 6, it may be determined whether an input address is included within the second memory (at 610). If the input address is determined not to be included within the second memory, a block quantity indicating the number of blocks of the first memory to be stored in the second memory is determined (at 620), and data corresponding to the input address may be output from the first memory to the CPU (at 630). Alternatively, if the input address determined to be included within the second memory, data corresponding to the input address may be output from the second memory to the CPU (at 640).

In another example embodiment of the present invention, a cache miss probability may be reduced, thereby reducing memory access times, by storing a plurality of adjacent blocks associated with a main memory, and with a higher spatial locality, in a cache memory (e.g., as opposed to being limited to single block storage within the cache memory).

Example embodiments of the present invention being thus described, it will be obvious that the same may be varied in many ways. For example, it is understood that the above-described first and second logic levels may correspond to a higher level and a lower logic level, respectively, in an example embodiment of the present invention. Alternatively, the first and second logic levels/states may correspond to the lower logic level and the higher logic level, respectively, in other example embodiments of the present invention.

Such variations are not to be regarded as a departure from the spirit and scope of example embodiments of the present invention, and all such modifications as would be obvious to one skilled in the art are intended to be included within the scope of the following claims.

What is claimed is:

1. A cache memory system comprising:
a central processing unit (CPU) and a first memory;
a second memory positioned between the CPU and the first memory and storing at least one block of the first memory;
a block quantity determination unit which determines a block quantity indicating a number of blocks of the first memory to be stored in the second memory, the block quantity being determined based on a number of times a reference address has been accessed; and
a masking circuit which, based on an input address, generates a masking address,
wherein if the number of times a reference address has been accessed does not exceed a reference value, one block is stored in the second memory, and if the number of times a reference address is accessed does exceed the reference value, a plurality of blocks are stored in the second memory,
wherein the block quantity determination unit includes
an index table including a plurality of entries, and
an index comparator which compares the masking address with an index associated with each of the plurality of entries and generates a comparison signal indicating a result of the comparison, and
wherein each of the plurality of entries includes an index storage unit which stores a given index and an access times storage unit which maintains a record of a number of times the given index has been accessed in response to the comparison signal by incrementing the record if the given index stored in the index storage unit matches the masking address.

2. The cache memory system of claim 1, wherein the CPU requests data at an input address and, if the input address is not included within the second memory, the second memory reads at least one block associated with the input address from the first memory, stores the read at least one block in the second memory, and transfers the requested data corresponding to the input address of the first memory to the CPU.

3. The cache memory system of claim 1, wherein the CPU requests data at an input address and, if the input address is included within the second memory, the second memory transfers the requested data to the CPU.

4. The cache memory system of claim 1, wherein the masking address is generated by excluding a masking bit from the input address.

5. The cache memory system of claim 4, wherein the block quantity determination unit further includes:
a control signal output unit which outputs a control signal based on a comparison between a record and a reference number.

6. The cache memory system of claim 5, wherein a number of the stored at least one block within the second memory is based on the number of masking bits.

7. The cache memory system of claim 6 wherein the second memory copies a plurality of blocks, from the first memory, in the second memory, if the record is higher than the reference number and the second memory stores one block, from the first memory, in the second memory, if the record is not higher than the reference number.

8. The cache memory system of claim 1, wherein the first memory is a main memory with a first operating speed and the second memory is a cache memory with a second operating speed, the first operating speed lower than the second operating speed and lower than an operating speed of the CPU.

9. The cache memory system of claim 1, wherein, if the masking address does not match any of the indexes stored in the index storage units of the plurality of entries of the index table, the masking address is added to the index table as a new entry.

10. The cache memory system of claim 1, wherein each of the plurality of entries includes a valid bit determination unit which indicates whether a corresponding entry is valid.

11. The cache memory system of claim 1, wherein the second memory includes a first cache and a second cache.

12. The cache memory system of claim 11, further comprising:
a cache miss inspection unit which transfers the input address to the masking circuit if the input address is not included within the first cache.

13. The cache memory system of claim 11, wherein the second cache includes a number of blocks of the first memory corresponding to a masking bit.

14. The cache memory system of claim 13, wherein the masking circuit receives the input address from the first cache and converts the input address into the masking address using the masking bit if the input address is not included within the first cache.

15. A method of retrieving data in a system including a central processing unit (CPU), a first memory and a second memory, comprising:
determining whether an input address included in the second memory;
determining a block quantity indicating a number of blocks, from the first memory, to be copied to the second memory, if the input address is not included within the second memory, the block quantity being determined based on a number of times a reference address has been accessed, the reference address being related to the input address, one block being stored in the second memory if the number of times a reference address has been accessed does not exceed a reference value, a plurality of blocks being stored in the second memory if the number of times a reference address is accessed does exceed the reference value; and
copying a number of blocks equal to the block quantity from the first memory to the second memory; and
transferring data corresponding to the input address in the first memory to the CPU,
wherein determining the block quantity includes
generating, based on the input address, a masking address including at least a portion of the input address, comparing the masking address with an index designating a zone in the first memory, maintaining a record indicating a number of times the index has been accessed based on whether the index matches the masking address, and determining the masking address to he a new index if the index does not match the masking address.

16. The method of claim 15, wherein maintaining the record includes:

comparing the record with a reference number;

storing a number of blocks of the first memory corresponding to the masking bit in the second memory if the record is greater than the reference number; and storing a single block of the first memory in the second memory if the record is not greater than the reference number.

17. The method of claim 15, wherein, if the second memory includes a first cache and a second cache, generating the masking address is only performed if the input address is not included within the first cache.

18. The method of claim 15, wherein the first memory is a main memory with a first operating speed and the second memory is a cache memory with a second operating speed, the first operating speed lower than the second operating speed and lower than an operating speed of the CPU.

19. The method of retrieving data of claim 15 wherein the second memory is positioned between the CPU and the first memory, and the block quantity is determined by a block quantity determination unit.

20. A cache memory system, comprising:

a cache memory receiving a request to provide data associated with an input address, determining whether the input address is included in the cache memory, loading a plurality of adjacent data blocks, associated with the input address, from a main memory if the input address is not included within the cache memory and if a number of times a reference address has been accessed exceeds a reference value, loading one block, associated with the input address, from the main memory if the input address is not included within the cache memory and if the number of times a reference address has been accessed does not exceed the reference value, the reference address being associated with the input address, wherein the caching device is configured to generate a masking address based on the input address, compare the masking address with an index associated with each of a plurality of entries included in an index table, and generate a comparison signal indicating a result of the comparison, and wherein each of the plurality of entries includes an index storage unit which stores a given index and an access times storage unit which maintains a record of a number of times the given index has been accessed in response to the comparison signal by incrementing the record if the given index stored in the index storage unit matches the masking address.

21. A method of retrieving data, comprising:

receiving a request to provide data associated with an input address;

determining whether the input address is included in a cache memory; and loading a plurality of blocks of the requested data associated with the input address from a main memory if the determining indicates the input address is not included in the cache memory and if a number of times a reference address has been accessed exceeds a reference value, and loading one block of the requested data associated with the input address from the main memory if the determining indicates the input address is not included in the cache memory and if the number of times a reference address has been accessed does not exceed the reference value, the reference address being associated with the input address, wherein the determining includes generating, based on the input address, a masking address including at least a portion of the input address, comparing the masking address with an index designating a zone in the first memory, maintaining a record indicating a number of times the index has been accessed based on whether the index matches the masking address, and deciding the masking address is a new index if the index does not match the masking address.

22. A method of retrieving data of claim 21 wherein the request to provide data is received at the cache memory, and the cache memory loads the data from the main memory.

* * * * *